US009268420B2

(12) United States Patent
Liu et al.

(10) Patent No.: US 9,268,420 B2
(45) Date of Patent: Feb. 23, 2016

(54) TOUCH PANEL STRUCTURE AND TOUCH DISPLAY PANEL STRUCTURE HAVING ANTENNA PATTERN AND RELATED COMMUNICATIONS DEVICE HAVING SUCH TOUCH PANEL STRUCTURE

(75) Inventors: Yi-Ting Liu, Taoyuan County (TW); I-Cheng Chuang, Taoyuan County (TW); Chih-Kai Hu, Taoyuan County (TW); Shih-Po Chien, Taoyuan County (TW); Wei-Yang Wu, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 975 days.

(21) Appl. No.: 13/454,098

(22) Filed: Apr. 24, 2012

(65) Prior Publication Data

US 2013/0229362 A1 Sep. 5, 2013

Related U.S. Application Data

(60) Provisional application No. 61/606,477, filed on Mar. 5, 2012.

(51) Int. Cl.
*G06F 3/041* (2006.01)
*H01Q 1/24* (2006.01)
(Continued)

(52) U.S. Cl.
CPC .............. *G06F 3/041* (2013.01); *G06F 1/1698* (2013.01); *H01Q 1/243* (2013.01); *H01Q 1/44* (2013.01); *H01Q 7/00* (2013.01)

(58) Field of Classification Search
CPC .................. G06F 1/1698; G06F 3/041–3/047; H01Q 7/00; H01Q 1/44; H01Q 1/243
See application file for complete search history.

(56) References Cited

U.S. PATENT DOCUMENTS

2004/0183788 A1  9/2004 Kurashima
2009/0061926 A1* 3/2009 Lee ............................ 455/556.1
(Continued)

FOREIGN PATENT DOCUMENTS

CN  101615366 A  12/2009
CN  201876848 U  6/2011
(Continued)

OTHER PUBLICATIONS

Office action mailed on Jul. 9, 2014 for the Taiwan application No. 101124224, filing date Jul. 5, 2012, p. 1-8.
(Continued)

*Primary Examiner* — Lun-Yi Lao
*Assistant Examiner* — Kelly B Hegarty
(74) *Attorney, Agent, or Firm* — Winston Hsu; Scott Margo

(57) ABSTRACT

For a communication device having a touch module or a touch display module, a near field communicable NFC antenna pattern is disposed on a component above a touch sensor unit of the touch module or the touch display module, which places the NFC antenna pattern away from the shielding easily generated from the metallic frame or metallic housing of the communication device. The NFC antenna pattern may be printed on a bottom side, a top side, or in the interior of a cover lens of the touch module or the touch display module, or on a surface of a deco film outside the cover lens. A ferrite sheet may also be disposed between the NFC antenna pattern and the touch sensor unit for further preventing electromagnetic interference from the touch sensor unit or other internal components.

27 Claims, 10 Drawing Sheets

(51) Int. Cl.
*H01Q 1/44* (2006.01)
*H01Q 7/00* (2006.01)
*G06F 1/16* (2006.01)

(56) References Cited

U.S. PATENT DOCUMENTS

| | | |
|---|---|---|
| 2010/0245265 A1 | 9/2010 | Sato |
| 2010/0321325 A1 | 12/2010 | Springer |
| 2011/0151937 A1 | 6/2011 | Kusuda |
| 2011/0273382 A1 | 11/2011 | Yoo |
| 2013/0052971 A1* | 2/2013 | Jamshidi-Roudbari ............... H04B 15/04 455/114.2 |
| 2013/0090073 A1* | 4/2013 | Zhu et al. ..................... 455/90.2 |
| 2013/0162594 A1* | 6/2013 | Paulsen et al. ................ 345/174 |
| 2013/0196596 A1* | 8/2013 | Parekh et al. ................ 455/41.1 |

FOREIGN PATENT DOCUMENTS

| | | |
|---|---|---|
| JP | 2006048166 A | 2/2006 |
| TW | M375932 | 3/2010 |
| TW | M375932 U1 | 3/2010 |
| TW | M416105 | 11/2011 |
| TW | M416105 U1 | 11/2011 |

OTHER PUBLICATIONS

Office action mailed on Aug. 13, 2013 for the DE application No. 102013203641.8, p. 1-5.
Office action mailed on Jul. 3, 2015 for the China application No. 201210262601.0, filing date Jul. 26, 2012.

* cited by examiner

TOUCH PANEL STRUCTURE AND TOUCH DISPLAY PANEL STRUCTURE HAVING ANTENNA PATTERN AND RELATED COMMUNICATIONS DEVICE HAVING SUCH TOUCH PANEL STRUCTURE

CROSS REFERENCE TO RELATED APPLICATIONS

This application claims the benefit of U.S. Provisional Application No. 61/606,477, which was filed on Mar. 5, 2012, and is incorporated herein by reference.

BACKGROUND OF THE INVENTION

1. Field of the Invention

The application relates to a touch panel structure having antenna pattern, and more particularly, to a touch panel structure and related communication device that dispose the antenna at the panel side away from the metallic housing, while the antenna is near field communicable.

2. Description of the Prior Art

Antenna is used for transmitting or receiving radio waves so that data in the form of radio signals may be conveyed. For electronic products with wireless local area network (WLAN) communication function such as the laptop computers or tablet computers, a built-in antenna is necessary for transmission of data through the wireless network. The advancement of technology in radio communication has led to wireless communication system operating in various distinct frequencies. For example, The Institute of Electrical and Electronics Engineers (IEEE) has regulated the wireless local area network standard IEEE 802.11a with the carrier central frequency at roughly around 5 GHz, while the IEEE 802.11b has the carrier central frequency at roughly around 2.4 GHz. Hence, an ideal antenna should cover various frequency bands required in wireless communication network for easy access by a user. Additionally, the size of an antenna should be as small as possible to be integrated into a mobile device.

Now that the size of a mobile phone is getting smaller, an old-fashioned antenna structure that protrudes from the housing of the device is strange, leading to a modern design with the antenna taking a form of plate-like antenna and built in the housing of the device. An antenna utilizes electromagnetic waves travelling in the space to transmit or receive messages and is easily interfered by any undesired electromagnetic waves. Since a mobile phone contains many other electrical components, each inevitably radiating electromagnetic waves during its operation, these radiated electromagnetic waves interfere, more or less, the operation of the antenna. As a result, some mobile phones have designs that shield those electrical components, which interferes the operation of the antenna, looking for reducing such unwelcomed interference by the leaking electromagnetic waves. Generally, such design requires restricting the configuration of the antenna at the housing, the antenna being squeezed either at a single side or at the corner of the housing, and apparently limits the freedom of the layout and design of the antenna, not to mention the ability of the antenna to transmit and receive the signals. Secondly, since the antenna is usually disposed within the back cover of the device, the transmission of the antenna may be influenced if the device uses a metallic back cover. Additionally, it is obvious that not every electrical component of the device is shieldable with a metallic housing or other wave-absorptive or magnetic material. The touch panel is one of such components, which requires to be touched by a user and is impossible to be fully shielded. Leak of electromagnetic waves from such components and interference to the antenna can not be prevented. Still one more problem is that the increasing size of the touch panel leaves little room for the antenna, which worsens all the aforesaid problems.

Hence, it is a primary objective to effectively enhance the frequency band of the antenna while meeting the room limitation of a miniaturizing mobile device.

SUMMARY OF THE INVENTION

Hence, an objective of the embodiment of the invention is to provide a touch panel structure having antenna pattern such that the distance between the antenna and internal electrical components may be increased to reduce the electromagnetic interference and improve the performance of the antenna, while having near field communication ability.

An embodiment of the invention provides a touch panel structure having antenna pattern. The touch panel structure includes a frame, a display module disposed in the frame, a touch module disposed on the display module, and an antenna pattern. The touch module includes a touch sensor unit disposed on the display module, and a cover lens disposed on the touch sensor unit. The antenna pattern is disposed above the touch sensor unit.

Another embodiment of the invention provides a touch panel structure having antenna pattern. The touch panel structure includes a frame, a display module disposed in the frame, a touch module disposed on the display module, an antenna, and a ferrite sheet. The touch module includes a touch sensor unit disposed on the display module, and a cover lens disposed on the touch sensor unit. The antenna pattern is printed on a surface of the cover lens facing the touch sensor unit and is located outside the touch sensor unit. The ferrite sheet is disposed between the antenna pattern and the touch sensor unit.

Still another embodiment of the invention provides a communication device having antenna pattern disposed in a touch panel structure. The communication device includes a metallic housing, a body module disposed in the metallic housing, a touch panel structure disposed on the body module, and an antenna pattern. The touch panel structure includes a frame, a display module disposed in the frame, and a touch module disposed on the display module. The touch module includes a touch sensor unit disposed on the display module, and a cover lens disposed on the touch sensor unit. The antenna pattern is disposed above the touch sensor unit.

Still another embodiment of the invention provides a communication device having antenna pattern. The communication device includes a metallic housing, a body module disposed in the metallic housing, a touch panel structure disposed on the body module, an antenna pattern, and a ferrite sheet. The touch panel structure includes a frame, a display module disposed in the frame, and a touch module disposed on the display module. The touch module includes a touch sensor unit disposed on the display module, and a cover lens disposed on the touch sensor unit. The antenna pattern is printed on a surface of the cover lens facing the touch sensor unit and is located outside the touch sensor unit. The ferrite sheet is disposed between the antenna pattern and the touch sensor unit.

Still another embodiment of the invention provides a touch display panel structure having antenna pattern. The touch display panel structure includes a frame, a touch display module disposed in the frame, and an antenna pattern. The touch display module includes a display unit, a touch sensor unit disposed on the display unit, and a cover lens disposed on the touch sensor unit. The antenna pattern is disposed above the touch sensor unit.

The touch panel structure, the communication device, or the touch display panel structure of the application further includes a deco film and an optically clear adhesive (OCA). The deco film is disposed above the cover lens wherein the antenna pattern is printed on a surface of the deco film, and the OCA is disposed between the cover lens and the surface of the deco film.

The touch panel structure, the communication device, or the touch display panel structure of the application further includes that the antenna pattern is printed on a surface of the cover lens, the surface of the cover lens not facing the touch sensor unit.

The touch panel structure, the communication device, or the touch display panel structure of the application further includes that the antenna pattern is a near field communication (NFC) antenna or a loop antenna.

The touch panel structure, the communication device, or the touch display panel structure of the application further includes that the cover lens includes a first layer and a second layer, wherein the first layer is disposed on the touch sensor unit, the second layer is disposed on the first layer, and the antenna pattern is printed and disposed between the first layer and the second layer. A ferrite sheet is further included to be disposed between the first layer and the touch sensor unit.

The touch panel structure, the communication device, or the touch display panel structure of the application further includes that the antenna pattern is printed on a surface of the cover lens facing the touch sensor unit, the touch panel structure further comprising a ferrite sheet disposed between the antenna pattern and the touch sensor unit.

The communication device of the application further includes that the body module includes at least a battery and a main board.

These and other objectives of the present application will no doubt become obvious to those of ordinary skill in the art after reading the following detailed description of the preferred embodiment that is illustrated in the various figures and drawings.

DETAILED DESCRIPTION

Figure 1:
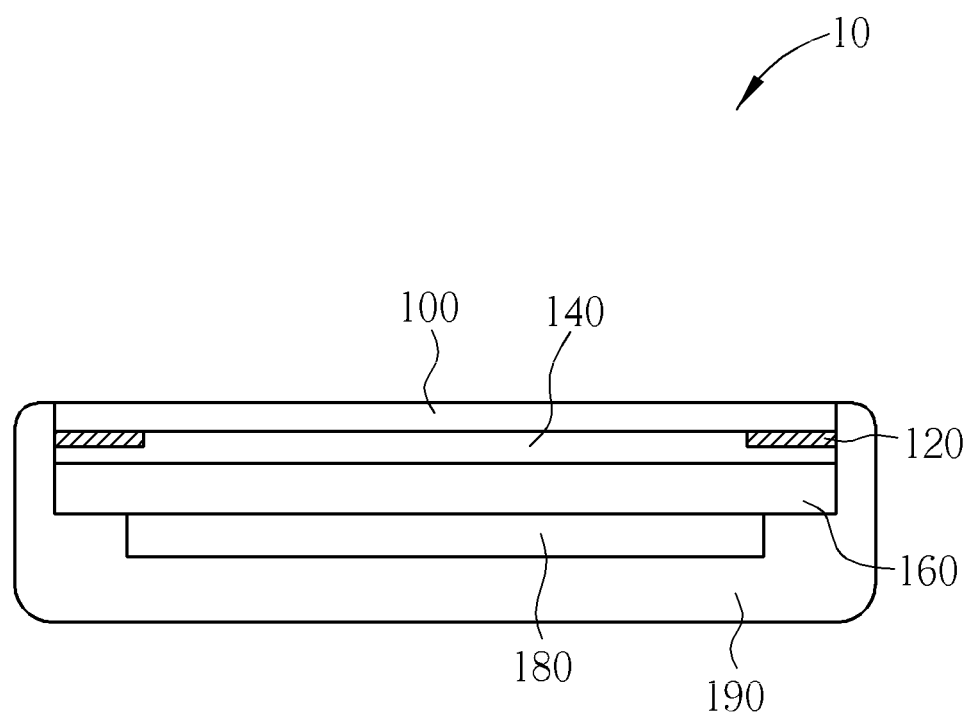
FIG. 1 is an illustration of one of the embodiments of the invention that shows a touch panel structure.

Please refer to FIG. 1. FIG. 1 is an illustration of one of the embodiments of the invention that shows a touch panel structure 10 having antenna pattern. The touch panel structure 10 is used in a portable electronic device or a communication device, which may be, but not limited to, a smart phone, a personal digital assistant (PDA), a tablet computer, etc. The touch panel structure 10 (or a touch display panel structure) includes at least a deco film 100, an antenna pattern 120, an optical clear adhesive 140 (OCA), a touch module 160, a display module 180, and a frame 190. The touch module 160 includes at least a cover lens and a touch sensing unit, which includes a touch sensor, an ITO. The display module 180 is disposed in the frame 190, the touch module 160 is disposed on the display module 180, and the antenna pattern 120 is printed on a surface of a substrate (the deco film 100), which is further adhered to a transparent layer that may be either a distinct layer other than the touch module 160 and the display module 180 or a layer integrated to, for example, the top side of the touch module 160 or the display module 180. The touch module 160 and the display module may also be integrated as a touch display module where the antenna pattern 120 may still be printed on a surface of the substrate (the deco film 100), which is adhered to a transparent layer that may be either a distinct layer other than the touch display module or a layer integrated to, for example, the top side (the cover lens) of the touch display module.

Preferably, the antenna pattern 120 is a loop antenna, which is a conductor usually closely coiled as a circular, rectangular, or triangular curve on a plane surface and has a resemblance of working principle as a bipolar antenna. The loop antenna is a resonance antenna, too, which has the feature of low profile in need of less room for deployment. Additionally, the antenna pattern 120 is a near field communication antenna such as a Near Field Communication (NFC) antenna or a Radio Frequency Identity (RFID) antenna, whose frequency band falls between 10~20 MHz with a most suitable trans/receive one in 13.56 MHz. For the antenna pattern 120 integrated in the touch module 160, since the antenna pattern 120 is disposed at the top/outer side of the transparent layer (the most surfaced layer of the touch module 160, may be the cover lens for example), the antenna pattern 120 is far more distanced from the electrical components down beneath, which may substantially reduce the electromagnetic effect caused by the electrical components and hence a ferrite sheet can no longer be needed to reduce cost of manufacture. On the other hand, the technique disclosed in the embodiment of the invention also avoids the antenna pattern 120 from blocking the visible area of the display module 180, while increasing the area required by the antenna pattern 120 (the effective resonance area) to improve the antenna performance and the working range of the antenna. It needs to be noted that besides forming the antenna pattern 120 on the surface of the substrate (the deco film 100) by printing, the antenna pattern 120 may also be formed on the deco film 100 via particular technique such as the Laser Direct Structuring (LDS), electroplating or chemical plating designated thickness and electrical characteristics of the metallic film. Any technology that can be used to form the antenna pattern 120 on the deco film 100 falls within the scope of the application. In this embodiment, transparent high polymer may also be used as the cover lens of the touch module 160.

In the embodiments of the invention, the antenna pattern 120 may be composed by a flexible printed circuit (FPC), which means the looping and the signal feeding end of the antenna pattern 120 are formed on a single flexible board. However, the antenna pattern 120 may also be composed by a flexible board and a metallic layer, which means the looping of the antenna pattern 120 is realized on the metallic layer while the signal feeding end is realized on the flexible board. The way how the signals are fed may be categorized into two-feeding-ends type or one-feeding-end-one-ground-end type. The two-feeding-ends type conveys the signals in a differential way and the one-feeding-end-one-ground-end type conveys the signals through single end.

Figure 2:
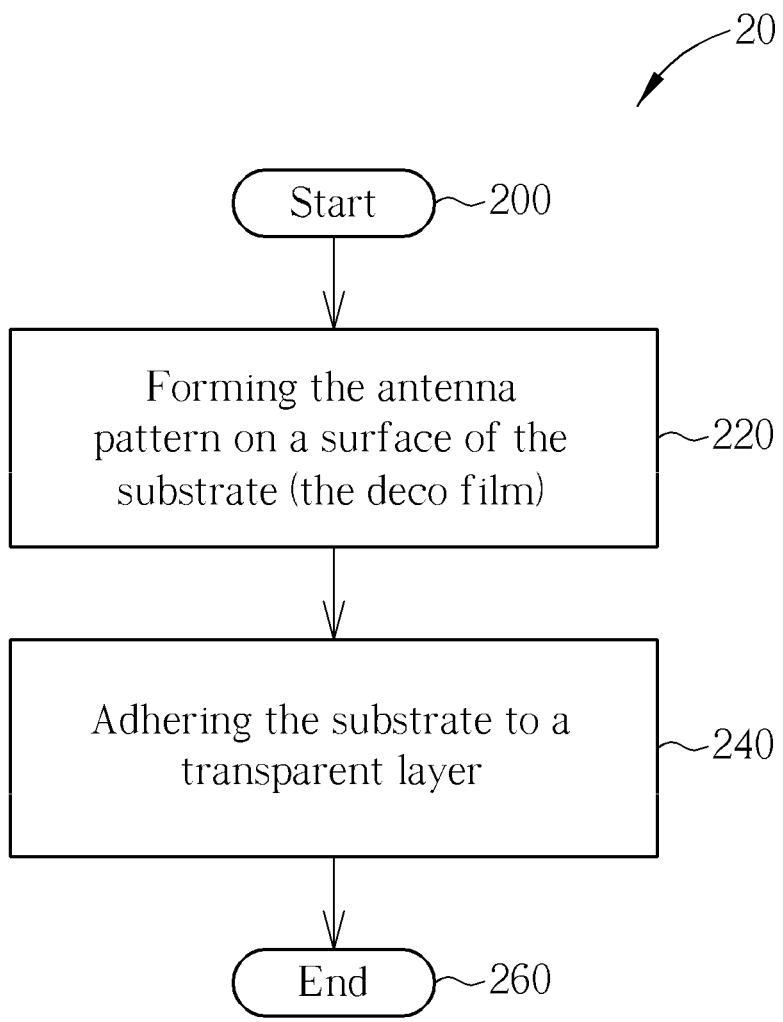
FIG. 2 is an illustration of a process according to the embodiment.

The way of making the antenna pattern of the touch panel structure 10 can be further concluded to a process 20 as illustrated in FIG. 2. The process 20 may enhance the antenna pattern 120 in the touch panel structure 10, including the following steps:

Step 200: Start;
Step 220: Forming the antenna pattern 120 on a surface of the substrate (the deco film 100);
Step 240: Adhering the substrate to a transparent layer;
Step 260: End.

The process 20 is the antenna design of the touch panel structure 10. Detailed description or alteration may be referred to the previous paragraphs and is omitted here for brevity.

Figure 3:
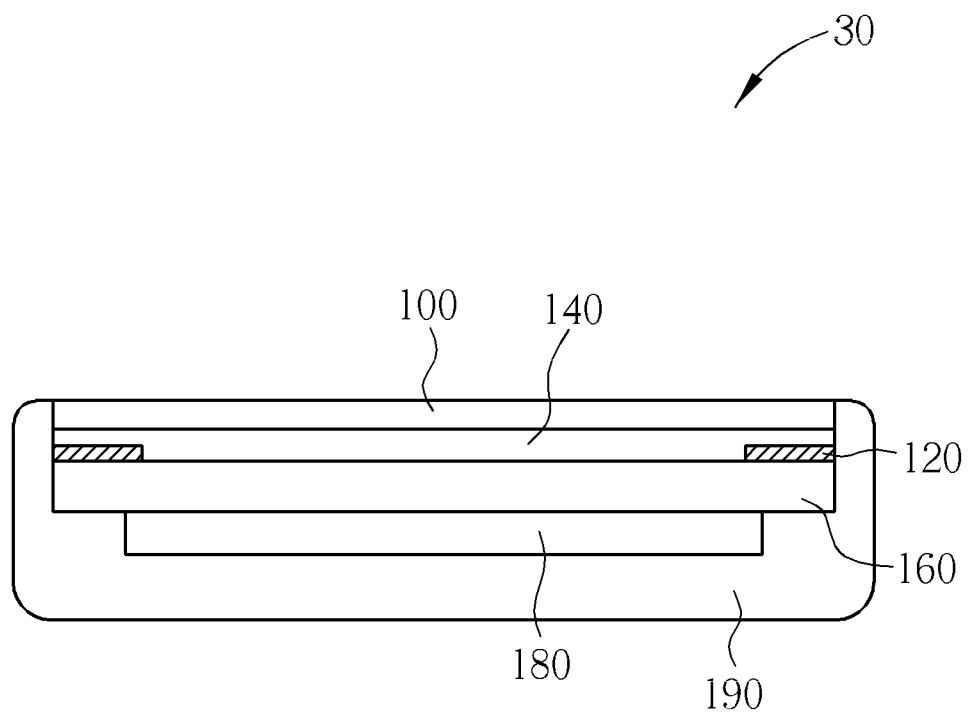
FIG. 3 is an illustration of one of the embodiments of the invention that shows a touch panel structure.

Please refer to FIG. 3. FIG. 3 is an illustration of one of the embodiments of the invention that shows a touch panel structure 30 (or a touch display panel structure) having antenna pattern. The touch panel structure 30 has similar structure as the touch panel structure 10 and those same components have same designated number. Detailed description of the structure of the touch panel structure 30 can be referred to the previous paragraphs and is omitted here fore brevity. The antenna pattern 120 of the touch panel structure 30 is printed directly on a surface of the cover lens of the touch module 160 and the substrate (the deco film 100 for example) is adhered to the surface of the cover lens having the antenna pattern 120. In such way, the antenna pattern 120 is far more distanced from the electrical components down beneath, which may substantially reduce the electromagnetic effect caused by the electrical components and hence a ferrite sheet can no longer be needed to reduce cost of manufacture. On the other hand, the technique disclosed in the embodiment of the invention also avoids the antenna pattern 120 from blocking the visible area of the display module 180, while increasing the area requested by the antenna pattern 120 (the effective resonance area) to improve the antenna and the working range of the antenna. It needs to be noted that besides forming the antenna pattern 120 on the surface of the cover lens by printing, the antenna pattern 120 may also be formed on/outside the cover lens via particular technique such as the Laser Direct Structuring (LDS), electroplating or chemical plating designated thickness and electrical characteristics of the metallic film. Any technique that can be used to form the antenna pattern 120 on the cover lens falls within the scope of the subject application. Additionally, in the embodiments of FIG. 1 and FIG. 3, the deco film 100 is disposed above (or lies on) the cover lens wherein the antenna pattern 120 is printed on a surface of the deco film 100 facing the cover lens (FIG. 1) or on a surface of the cover lens facing the deco film 100 (FIG. 3), and the OCA 140 is disposed between the cover lens of the touch module 160 and the deco film 100.

Figure 4:
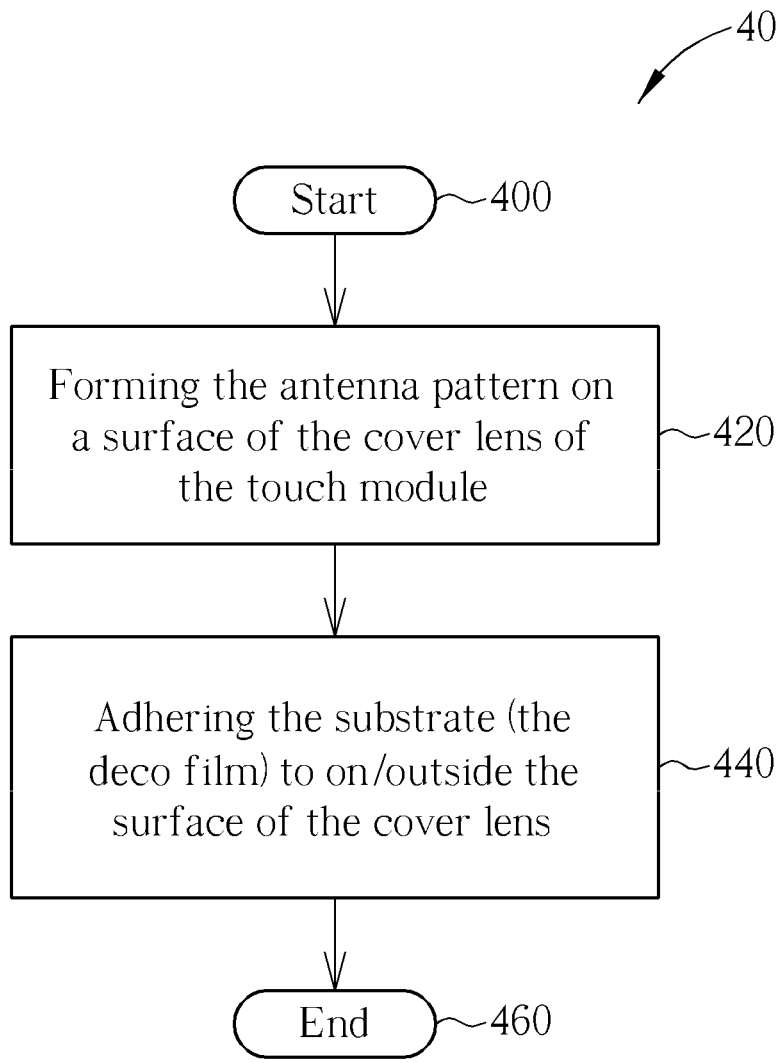
FIG. 4 is an illustration of a process according to the embodiment.

The way of making the antenna pattern of the touch panel structure 30 can be further concluded to a process 40 as illustrated in FIG. 4. The process 40 may enhance the antenna pattern 120 in the touch panel structure 30, including the following steps:

Step 400: Start;
Step 420: Forming the antenna pattern 120 on a surface of the cover lens of the touch module 160;
Step 440: Adhering the substrate (the deco film 100, for example) to on/outside the surface of the cover lens;
Step 460: End.

The process 40 is the antenna design of the touch panel structure 30. Detailed description or alteration may be referred to the previous paragraphs and is omitted here for brevity.

Figure 5:
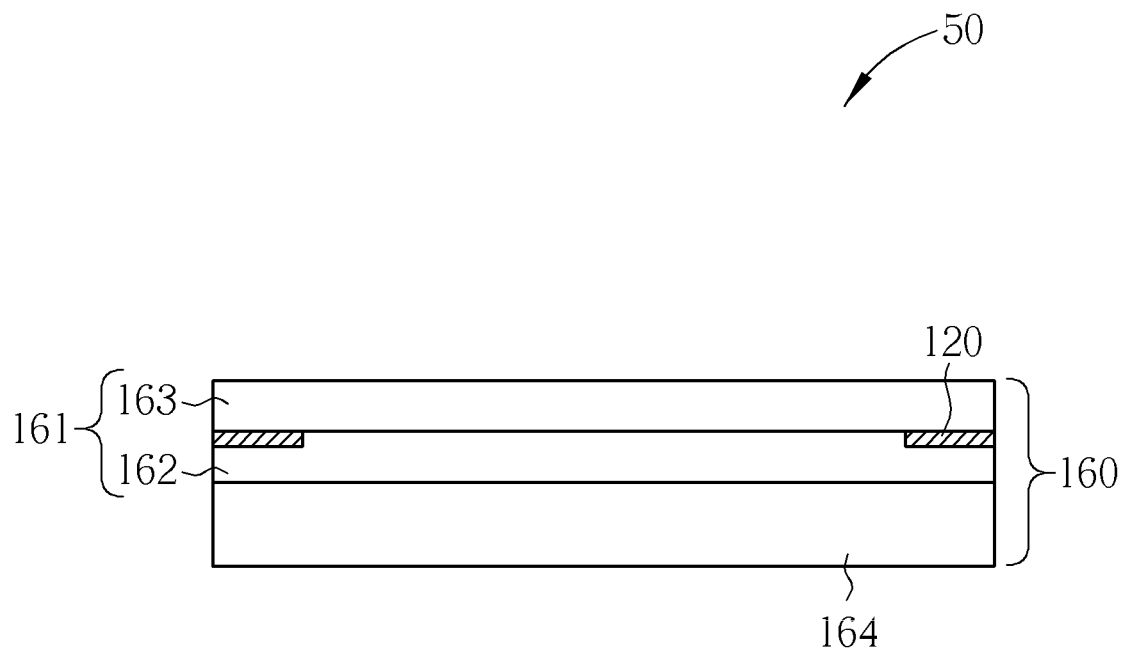
FIG. 5 is an illustration of one of the embodiments of the invention that shows a touch panel structure.

Please refer to FIG. 5. FIG. 5 is an illustration of one of the embodiments of the invention that shows a touch panel structure 50 (or a touch display panel structure) having antenna pattern. The touch panel structure 50 has similar structure as the touch panel structure 10 and only those different from the touch panel structure 10 are shown in FIG. 5. The antenna pattern 120 of the touch panel structure 50 is printed between the cover lens 161 of the touch module 160. A touch sensor unit 164 of the touch module 160 is disposed on the display module 180 (referring to FIG. 1 and FIG. 3), while the cover lens 161 is disposed on the touch sensor unit 164. More specifically, the cover lens 161 includes at least a first layer 162 and a second layer 163, where the first layer 162 is disposed on the touch sensor unit 164 and the second layer 163 is disposed on the first layer 162. The antenna pattern 120 is printed and disposed between the first layer 162 and the second layer 163. Similarly, the ferrite sheet can no longer be needed to reduce cost of manufacture. Additionally, the deco film 100 is also not needed in such structure of the embodiment in FIG. 5. The antenna pattern 120 may be formed inside the cover lens 161 via insert molding, or any available technologies to put the antenna pattern 120 within the cover lens 161, which should be regarded as, but not limited to, the scope of the invention.

Figure 6:
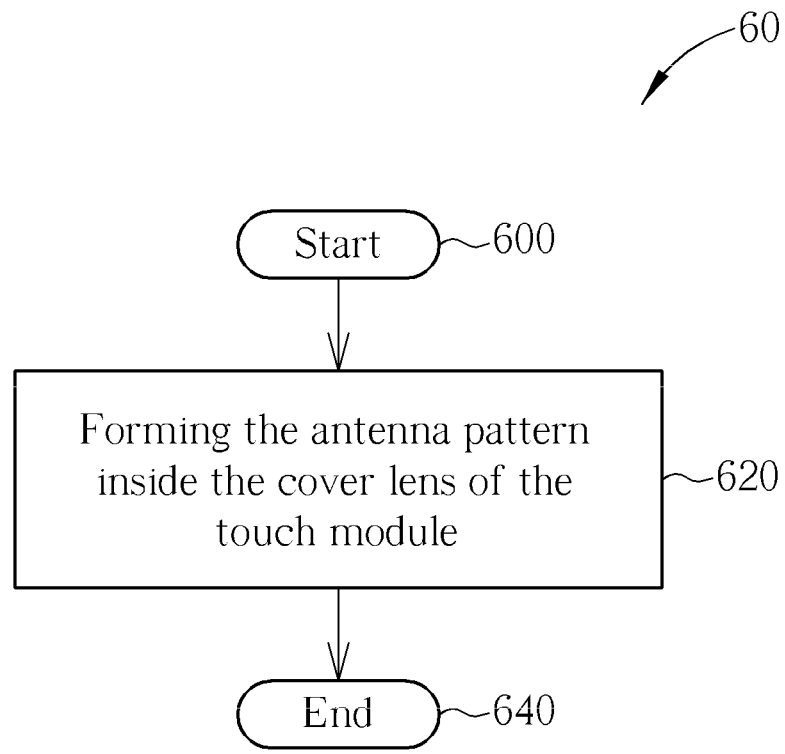
FIG. 6 is an illustration of a process according to the embodiment.

The way of making the antenna pattern of the touch panel structure 50 can be further concluded to a process 60 as illustrated in FIG. 6. The process 60 may enhance the antenna pattern 120 in the touch panel structure 50, including the following steps:

Step 600: Start;
Step 620: Forming the antenna pattern 120 inside the cover lens 161 of the touch module 160;
Step 640: End.

The process 60 is the antenna design of the touch panel structure 50. Detailed description or alteration may be referred to the previous paragraphs and is omitted here for brevity.

Figure 7:
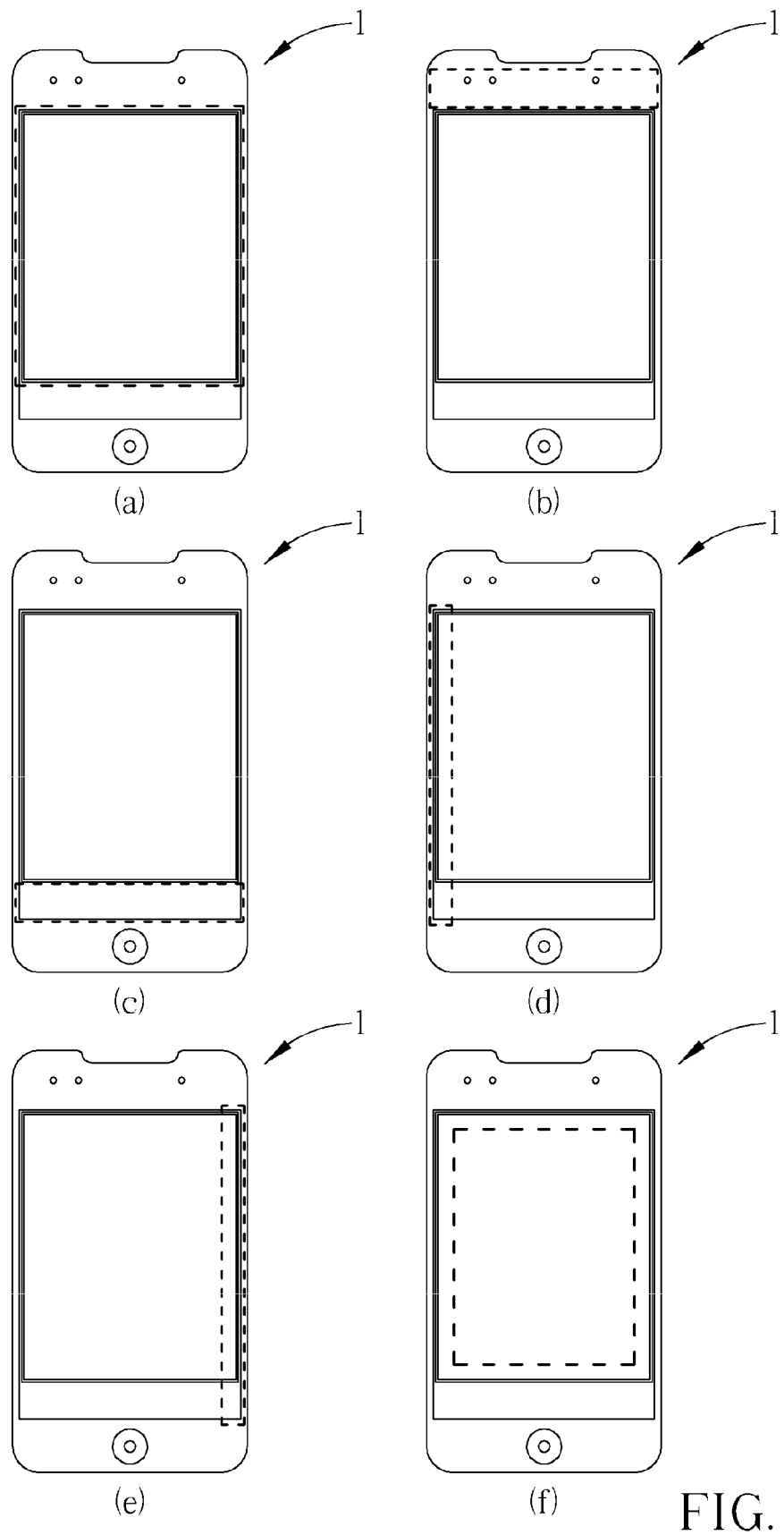
FIG. 7 is an illustration of configurations of the antenna pattern in a communication device according to the embodiments of the invention.

Please refer to FIG. 7, which is an illustration of configurations of the antenna pattern 120 in a communication device 1 according to the embodiments of the invention. The area occupied by the antenna pattern 120 may be the dashed lines on their own or the area bounded by the dashed lines. In FIG. 7, diagram (a) shows that the antenna 120 is located at the peripheral of the display module, the touch module, or the touch display module, diagram (b) shows that the antenna 120 is located at a top side of the display module, the touch module, or the touch display module, diagram (c) shows that the antenna 120 is located at a bottom side of the display module, the touch module, or the touch display module, diagram (d) shows that the antenna 120 is located at a left side of the display module, the touch module, or the touch display module, diagram (e) shows that the antenna 120 is located at a right side of the display module, the touch module, or the touch display module, and diagram (f) shows that the antenna 120 is located at middle side of the display module, the touch module, or the touch display module. In such way, the antenna pattern 120 shown in the embodiments of the invention may substantially avoid blocking the visible area, increase the area of the antenna pattern 120, improve the antenna performance, and increase the working range of the antenna.

Figure 8:
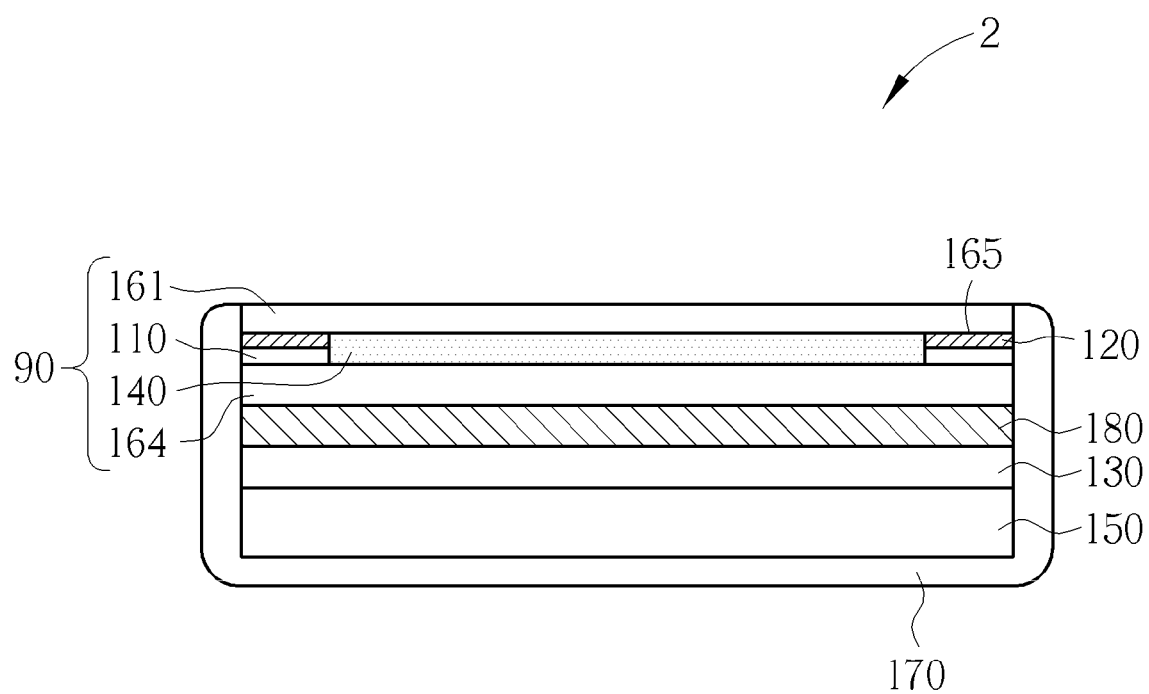
FIG. 8 is an illustration showing sectional view of a first embodiment of a communication device that has antenna pattern disposed on the touch panel structure according to the subject application.

Please refer to FIG. 8, which is an illustration showing sectional view of a first embodiment of a communication device that has antenna pattern disposed on the touch panel structure according to the subject application. A communication device 2 includes at least a metallic housing 170, a body module (including at least a battery 150, a main board 130, and other related electronic components), a touch panel structure 90, and an antenna pattern 120. The body module is disposed in the metallic housing 170 and the touch panel structure 90 is disposed on the body module. Components in the communication device 2 the same as those in the previous touch panel structures 10, 30, 50 have same number depicted in FIG. 8. Detailed description of these components may be referred to the previous paragraphs and is omitted here for brevity. For the embodiment in FIG. 8, the antenna pattern 120 is disposed above (or lies on) the touch sensor unit 164, more specifically, printed on a surface 165 of the cover lens 161 facing the touch sensor unit 164. An OCA 140 is further disposed between the cover lens 161 and the touch sensor unit 164 for adhering the cover lens 161 with the touch sensor unit 164. Additionally, to effectively shield the electromagnetic interference from the touch sensor unit 164 and components beneath (the main board 130 and the battery 150 of the body module) to the antenna pattern 120, a ferrite sheet 110 may also be included in the communication device 2 and disposed between the antenna pattern 120 and the touch sensor unit 164.

Figure 9:
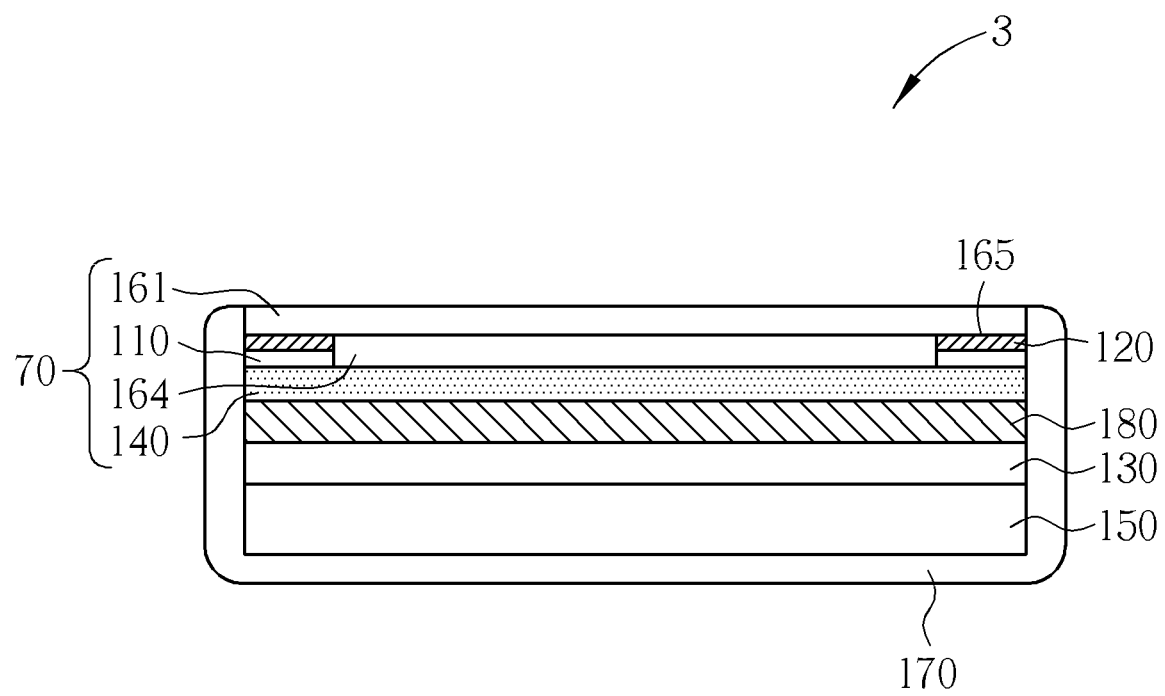
FIG. 9 is an illustration showing sectional view of a second embodiment of a communication device that has antenna pattern disposed on the touch panel structure according to the subject application.

Please refer to FIG. 9, which is an illustration showing sectional view of a second embodiment of a communication device that has antenna pattern disposed on the touch panel structure according to the subject application. A communication device 3 and its touch panel structure 70 include components the same as those in the previous communication device 2 and touch panel structures 10, 30, 50 have same number depicted in FIG. 9. Detailed description of these components may be referred to the previous paragraphs and is omitted here for brevity. For the embodiment in FIG. 9, the antenna pattern 120 is disposed above (or lies on) the touch sensor unit 164, more specifically, printed on a surface 165 of the cover lens 161 facing the touch sensor unit 164. The antenna pattern 120 is disposed outside the touch sensor unit 164 after the cover lens 161 and the touch sensor unit 164 are assembled to be the touch module 160 i.e., touch panel structure 70. An OCA 140 is further disposed between the touch sensor unit 164 and the main board 130 of the body module for adhering the touch sensor unit 164 with the display module 180. Additionally, to effectively shield the electromagnetic interference from the touch sensor unit 164 and components beneath (the main board 130 and the battery 150 of the body module) to the antenna pattern 120, a ferrite sheet 110 may also be included in the communication device 3 and disposed between the antenna pattern 120 and the touch sensor unit 164 along with the display module 180.

Figure 10:
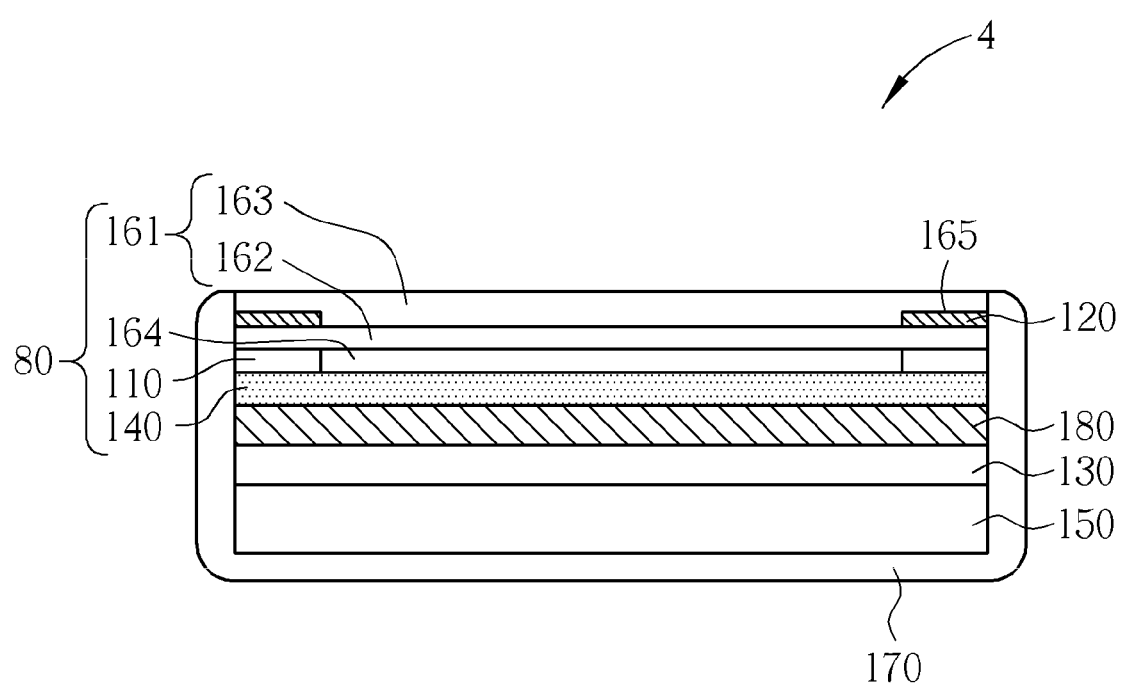
FIG. 10 is an illustration showing sectional view of a third embodiment of a communication device that has antenna pattern disposed on the touch panel structure according to the subject application.

Please refer to FIG. 10, which is an illustration showing sectional view of a third embodiment of a communication device that has antenna pattern disposed on the touch panel structure according to the subject application. A communication device 4 includes components the same as those in the previous communication devices 2, 3 and touch panel structures 10, 30, 50 have same number depicted in FIG. 10. Detailed description of these components may be referred to the previous paragraphs and is omitted here for brevity. For the embodiment in FIG. 10, the touch panel structure 80 is similar as the touch panel structure 50, whose antenna pattern 120 is disposed between the first layer 162 and the second layer 163 of the cover lens 161. To effectively shield the electromagnetic interference from the touch sensor unit 164 and components beneath (the main board 130 and the battery 150 of the body module) to the antenna pattern 120, a ferrite sheet 110 may also be included in the touch panel structure 80 and disposed between the first layer 162 of the cover lens 161 and the touch sensor unit 164 along with the display module 180.

Besides the embodiments shown in FIG. 8~FIG. 10, each of the touch panel structures 10, 20, 30 described previously may also be incorporated with the metallic housing 170 and the body module to form a communication device or a portable electronic device having features of the application.

The near field communicable NFC antenna pattern is disposed on a component above or outside the touch sensor unit of the touch module or the touch display module, which places the NFC antenna pattern away from the metallic frame or metallic housing of the communication device. The NFC antenna pattern may be printed on the bottom side, the top side, or in the interior of the cover lens of the touch module or the touch display module, or on the surface of the deco film outside the cover lens. The ferrite sheet may also be disposed between the NFC antenna pattern and the touch sensor unit for further preventing electromagnetic interference from the touch sensor unit or other internal components, improving the antenna. On the other hand, the visible area may not be blocked by the antenna pattern, while increasing the area requested by the antenna pattern and the working range of the antenna.

Those skilled in the art will readily observe that numerous modifications and alterations of the device and method may be made while retaining the teachings of the application. Accordingly, the above disclosure should be construed as limited only by the metes and bounds of the appended claims.

What is claimed is:

1. A touch panel structure having antenna pattern, comprising:
   a frame;
   a display module disposed in the frame;
   a touch module disposed on the display module, the touch module comprising:
   a touch sensor unit disposed on the display module; and
   a cover lens disposed on the touch sensor unit;
   an antenna pattern disposed above the touch sensor unit; and
   a ferrite sheet disposed between the antenna pattern and the touch sensor unit for preventing electromagnetic interference from the touch sensor unit.

2. The touch panel structure of claim 1, further comprising a deco film and an optically clear adhesive (OCA), the deco film disposed above the cover lens wherein the antenna pattern is printed on a surface of the deco film, the OCA is disposed between the cover lens and the surface of the deco film.

3. The touch panel structure of claim 1, wherein the antenna pattern is printed on a surface of the cover lens, the surface of the cover lens not facing the touch sensor unit.

4. The touch panel structure of claim 1, wherein the antenna pattern is a near field communication (NFC) antenna.

5. The touch panel structure of claim 1, wherein the antenna pattern is a loop antenna.

6. The touch panel structure of claim 1, wherein the cover lens comprises a first layer and a second layer, wherein the first layer is disposed on the touch sensor unit, the second layer is disposed on the first layer, and the antenna pattern is printed and disposed between the first layer and the second layer.

7. The touch panel structure of claim 6, wherein the ferrite sheet is disposed between the first layer and the touch sensor unit.

8. The touch panel structure of claim 1, wherein the antenna pattern is printed on a surface of the cover lens facing the touch sensor unit.

9. A touch panel structure having antenna pattern, comprising:
a frame;
a display module disposed in the frame;
a touch module disposed on the display module, the touch module comprising:
a touch sensor unit disposed on the display module; and
a cover lens disposed on the touch sensor unit;
an antenna pattern printed on a surface of the cover lens facing the touch sensor unit and located outside the touch sensor unit; and
a ferrite sheet disposed between the antenna pattern and the touch sensor unit for preventing electromagnetic interference from the touch sensor unit.

10. A communication device having antenna pattern disposed in a touch panel structure, comprising:
a metallic housing;
a body module disposed in the metallic housing;
a touch panel structure disposed on the body module, the touch panel structure comprising:
a frame;
a display module disposed in the frame; and
a touch module disposed on the display module, the touch module comprising:
a touch sensor unit disposed on the display module; and
a cover lens disposed on the touch sensor unit;
an antenna pattern disposed above the touch sensor unit; and
a ferrite sheet disposed between the antenna pattern and the touch sensor unit for preventing electromagnetic interference from the touch sensor unit.

11. The communication device of claim 10, wherein the body module comprises at least a battery and a main board.

12. The communication device of claim 10, further comprising a deco film and an optically clear adhesive (OCA), the deco film disposed above the cover lens wherein the antenna pattern is printed on a surface of the deco film, the OCA is disposed between the cover lens and the surface of the deco film.

13. The communication device of claim 10, wherein the antenna pattern is printed on a surface of the cover lens, the surface of the cover lens not facing the touch sensor unit.

14. The communication device of claim 10, wherein the antenna pattern is a near field communication (NFC) antenna.

15. The communication device of claim 10, wherein the antenna pattern is a loop antenna.

16. The communication device of claim 10, wherein the cover lens comprises a first layer and a second layer, wherein the first layer is disposed on the touch sensor unit, the second layer is disposed on the first layer, and the antenna pattern is printed and disposed between the first layer and the second layer.

17. The communication device of claim 16, wherein the ferrite sheet is disposed between the first layer and the touch sensor unit.

18. The communication device of claim 10, wherein the antenna pattern is printed on a surface of the cover lens facing the touch sensor unit.

19. A communication device having antenna pattern, comprising:
a metallic housing;
a body module disposed in the metallic housing;
a touch panel structure disposed on the body module, the touch panel structure comprising:
a frame;
a display module disposed in the frame; and
a touch module disposed on the display module, the touch module comprising:
a touch sensor unit disposed on the display module; and
a cover lens disposed on the touch sensor unit;
an antenna pattern printed on a surface of the cover lens facing the touch sensor unit and located outside the touch sensor unit; and
a ferrite sheet disposed between the antenna pattern and the touch sensor unit for preventing electromagnetic interference from the touch sensor unit.

20. A touch display panel structure having antenna pattern, comprising:
a frame;
a touch display module disposed in the frame, the touch display module comprising:
a display unit;
a touch sensor unit disposed on the display unit; and
a cover lens disposed on the touch sensor unit;
an antenna pattern disposed above the touch sensor unit; and
a ferrite sheet disposed between the antenna pattern and the touch sensor unit for preventing electromagnetic interference from the touch sensor unit.

21. The touch display panel structure of claim 20, further comprising a deco film and an optically clear adhesive (OCA), the deco film disposed above the cover lens wherein the antenna pattern is printed on a surface of the deco film, the OCA is disposed between the cover lens and the surface of the deco film.

22. The touch display panel structure of claim 20, wherein the antenna pattern is printed on a surface of the cover lens, the surface of the cover lens not facing the touch sensor unit.

23. The touch display panel structure of claim 20, wherein the antenna pattern is a near field communication (NFC) antenna.

24. The touch display panel structure of claim 20, wherein the antenna pattern is a loop antenna.

25. The touch display panel structure of claim 20, wherein the cover lens comprises a first layer and a second layer, wherein the first layer is disposed on the touch sensor unit, the second layer is disposed on the first layer, and the antenna pattern is printed and disposed between the first layer and the second layer.

26. The touch display panel structure of claim 25, wherein the ferrite sheet is disposed between the first layer and the touch sensor unit.

27. The touch display panel structure of claim 20, wherein the antenna pattern is printed on a surface of the cover lens facing the touch sensor unit.

* * * * *